No. 781,533. PATENTED JAN. 31, 1905.
P. M. KLING.
BRAKE MECHANISM.
APPLICATION FILED AUG. 5, 1904.
2 SHEETS—SHEET 1.
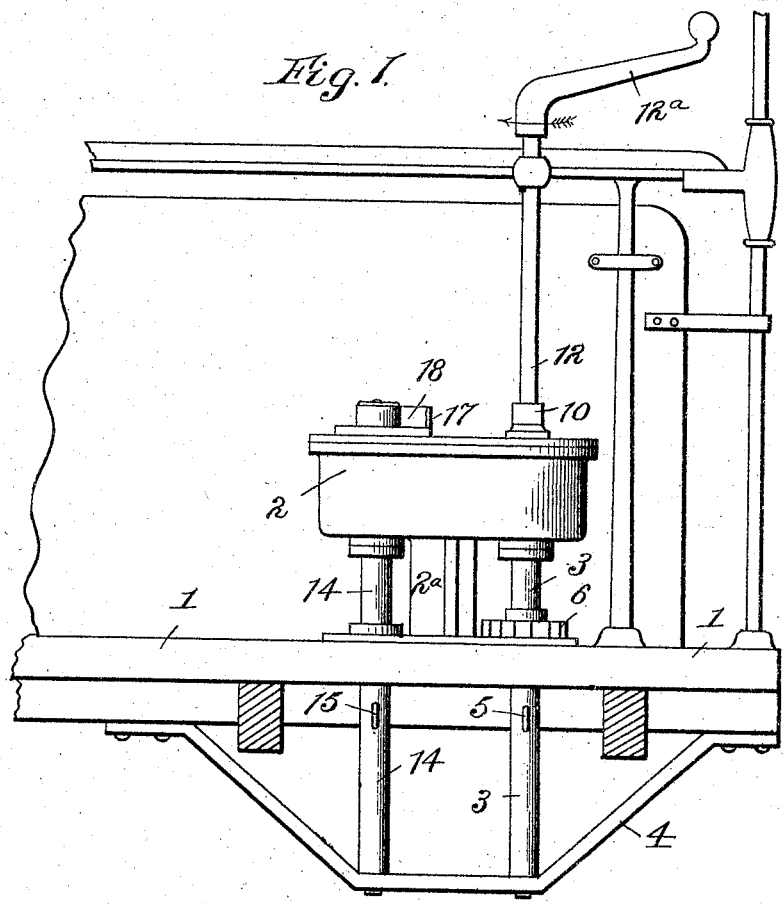
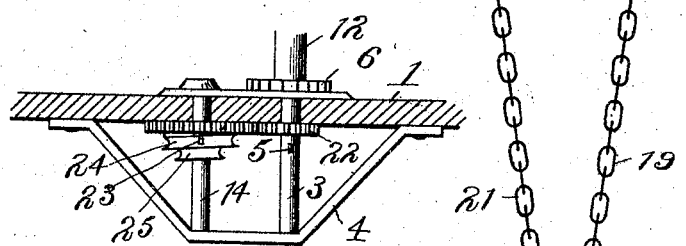
Witnesses
J. J. Liner
S. J. Hoexter
Peter M. Kling
Inventor
By his Attorneys Knight Bros

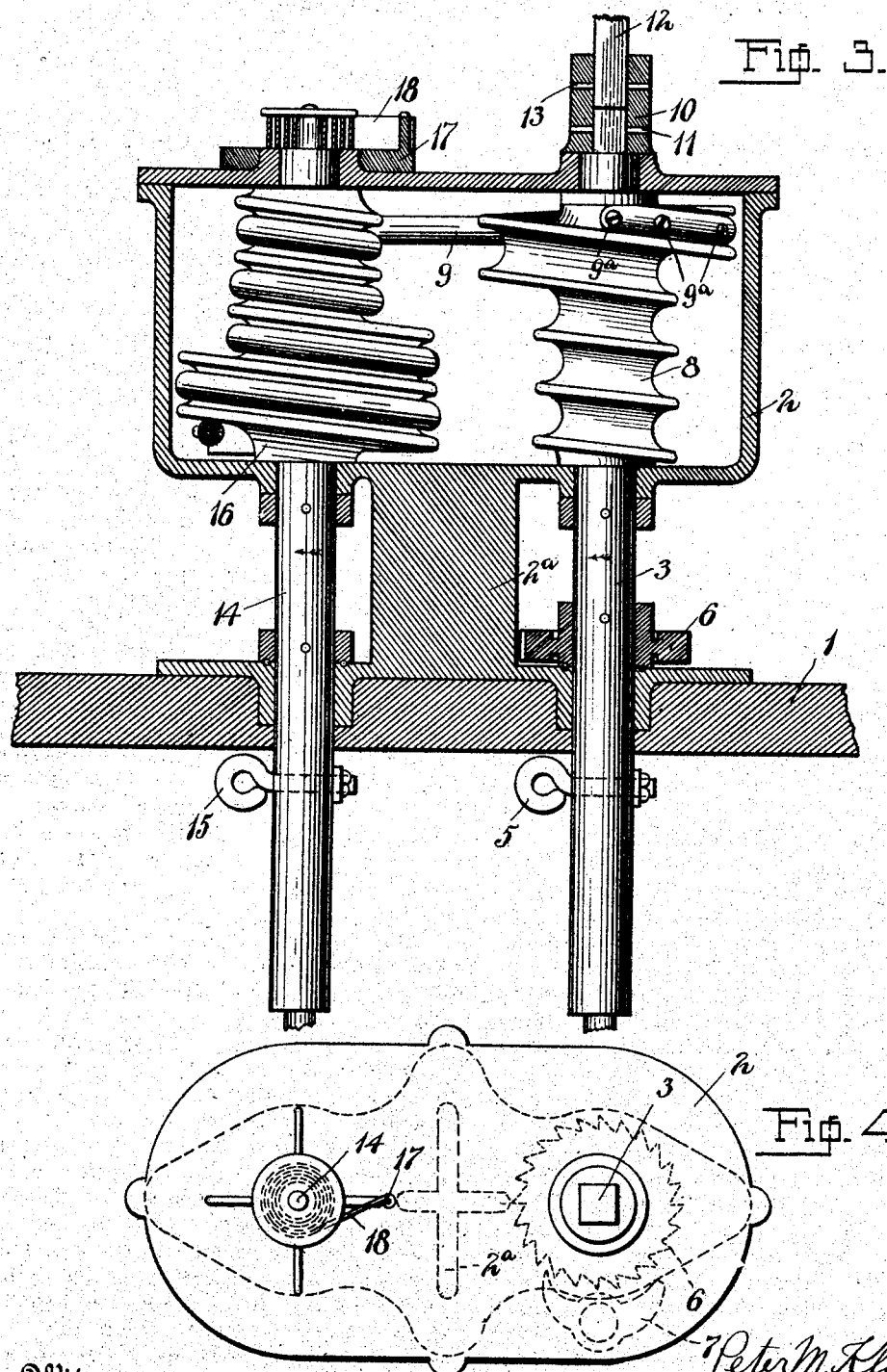

No. 781,533. Patented January 31, 1905.

UNITED STATES PATENT OFFICE.

PETER M. KLING, OF ELIZABETH, NEW JERSEY.

BRAKE MECHANISM.

SPECIFICATION forming part of Letters Patent No. 781,533, dated January 31, 1905.

Application filed August 5, 1904. Serial No. 219,611.

*To all whom it may concern:*

Be it known that I, PETER M. KLING, a citizen of the United States, residing at Elizabeth, in the county of Union and State of New Jersey, have invented certain new and useful Improvements in Brake Mechanism, of which the following is a specification.

My present invention relates to brake-actuating mechanism for cars and the like, and has for its object to provide an improved mechanism whereby the slack in the brake chain or cable may be rapidly taken up in order that the brake-shoes will be quickly moved into their braking positions. To this end I employ certain compensating mechanism whereby the action of the brake-handle or other brake-controlling device will be even and regular and through means of which the injurious jar of the parts ordinarily incident to brake mechanisms at the moment when the brake chain or cable becomes taut is obviated.

Another object of my invention is to give increased power to the brake mechanism when the same is in active engagement.

A further object of my invention is to provide an auxiliary brake chain or cable adapted to become operative in the event of the main chain or cable parting under the strain incident to a mechanism of this character.

A further object of my invention is to provide an improved means whereby the operative length of the brake-chain may be regulated. At times it is advantageous that the distance between the brake-shoe and the car-wheel be either increased or decreased—such, for instance, as when a car is transferred from a road of steep grades to a level road, or vice versa, or when a car is transferred from a heavy or muddy road to a light road. Since the brake chain or cable must essentially have a certain degree of slack therein, it is obvious that the shortening or lengthening of the operative length of said chain must act to decrease or increase the distance between the brake-shoe in its released position and the car-wheel.

A part of my invention, therefore, has for its object to adjust the distance between the brake-shoe in its released position and the car-wheel through the adjustment of the operative length of the brake-chain. This result is obtained through a simple adjustment of a portion of the operating mechanism hereinafter described.

Further objects of my invention are to provide many improved details of structure, clearly shown in the accompanying drawings, in which like reference-numbers refer to like parts, and in which—

Figure 1 is a sectional elevation of the preferred form of my improved mechanism mounted on the platform of an ordinary car with brake chains or cables removed. Fig. 2 is a sectional plan view of the main and auxiliary brake chains or cables, showing their connections to the brake-beam and their respective winding-spindles. Fig. 3 is an enlarged elevation of the preferred form of my mechanism with the crank-handle broken away and showing the cone-housing, the spindle-returning spring, the crank-ratchet, the car-platform in section, and the brake-chains removed. Fig. 4 is a plan view of said mechanism with the brake-handle removed. Fig. 5 is a detail elevation, with the crank-handle and the brake-chains removed, of a slightly-modified structure, showing the car-platform in section.

Referring now in detail to the drawings, 1 represents a portion of a car-platform, upon which is mounted a cone-housing 2 upon a standard $2^a$, suitably mortised in and bolted to the car-platform. Journaled in the car-platform 1 and the housing 2 is a winding-spindle 3, carrying an eyebolt 5 and seated in strap 4, bolted to the under side of car-platform 1. Spindle 3 has mounted thereon beneath the housing 2 and above the platform 1 a ratchet-wheel 6 of ordinary construction in position to be engaged by the pivoted dog 7, dotted lines, Fig. 4, to hold the said spindle against rotation. At its upper end spindle 3 has rigidly mounted thereon within the housing 2 an inverted cone 8, which may be provided with spiral grooves, if desired, and I have shown said cone provided with such and to which at its upper or larger end a cable 9 is secured. The spindle 3 passes through the housing 2 and is journaled at its upper end in the top of said housing, being squared, as shown in Figs. 3 and 4, at said upper end to receive a collar 10, connected rigidly with said squared portion of the spindle 3 by a cotter-pin 11. The collar 10 rotates on that portion of the housing 2 which forms the upper bearing for the spindle 3.

12 is a brake-handle rod which is squared at its lower end and adapted to fit snugly in collar 10 and is rigidly secured to collar 10 by cotter-pin 13. It is obvious that the spindle 3 and the brake-handle rod 12 may be made of one and the same piece of material, the object of the structure, as described, being merely to adapt old brake-handles to my new form of braking mechanism.

Extending parallel with the spindle 3, which I will hereinafter term the "auxiliary" spindle 3 for reasons hereinafter explained, is the main winding-spindle 14, journaled similarly as the spindle 3 in the car-platform and the housing 2 and provided likewise with an eyebolt 15. Spindle 14, near its upper end, within the housing 2 has rigidly mounted a cone 16, provided with grooves, if desired. Mounted on the top of housing 2 or in any other suitable position and secured at one end to a projection 17 is a spring 18, wound about and secured at its other end to the upper end of the spindle 14. The cable 9 is secured at its other end to the base or larger end of cone 16, so that said cable will be wound about on but one of said cones 8 16 at a time. It will be noted that the cones 8 16 are reversed. Cable 9, if desired, may be adjustably secured to the cone 8, as at 9ª, so that more or less of the cable may be paid out for purposes hereinafter described, Fig. 3.

19 is what I term the "auxiliary" chain or cable, connected at one end to the eyebolt 5 on auxiliary spindle 3 and connected at its other end to a double hook 20, which is connected to the brake-beam, such connection and brake-beam not being shown.

21 is what I term the "main" brake chain or cable, secured at one end to eyebolt 15 on the main spindle 14 and at its other end to the double hook 20.

A slightly-modified and simpler construction, but one which does not have all the advantages of the construction hereinbefore described, is shown in Fig. 5, wherein I dispense with the cone-housing and the cones therein, but maintain the spindles 3 and 14. Therein the brake-handle rod 12 is extended down through the car-platform and has mounted thereon the ratchet-wheel 6 immediately above the platform 1 and upon the spindle 3. Beneath the platform I mount a cog-wheel 22, meshing with cog-wheel 23 on the spindle 14, which is now journaled only in the strap 4 and platform 1. Beneath the cog-wheel 23 on the spindle 14 is an inverted winding-cone 24, provided with an eyebolt 25, adapted to receive the main brake-chain 21. The auxiliary brake-chain 19 is to be secured to the eyebolt 5.

Having now described my invention in detail, I will now describe the operation of the same. Ordinarily in brake mechanism for cars and the like there exists considerable slack in the brake-chain, which it is desirable to take up rapidly, so that the brake-shoe might be brought quickly to its effective position. In order to do this, the operator of the car must operate the brake-handle with great speed until the brake-chain or cable suddenly becomes taut, at which point comes a jar to the operator and to the parts of the brake mechanism as well. With the structure hereinbefore described this jar is obviated in the following manner: Rotation of rod 12 by the operator of a car or by the brake-operating device will rotate the cone 8, which having its greatest radius at its upper end, and since the cone 16 upon which the cable is wound when the brake-shoe is in its non-operative position, Fig. 3, has its smallest radius at its upper end, will rotate cones 16 at first with greater speed than the cone 8, so that the spindle 14, which rotates at the start at a multiplied speed, will quickly take up the slack in the brake-chain, and by the time that the cable 9 is, say, one-half wound on the cone 8 the two cones and two spindles will be rotating at approximately the same speed, at which time the main brake-chain will have become taut, and by the time that three-quarters of the cable 9 has been wound upon the cone 8 the spindle 14 will be rotating at less speed than the spindle 3. It will be seen from this that the main winding-spindle will attain a high speed at the commencement of the operation of the brake mechanism, at which time this is necessary for taking up slack in the main brake-chain, and that the same will operate with slower speed when the slack has been taken up, and at which time greater power must be exerted in bringing the brake into effective position, and that such multiplied power at the end of the operation is provided by a minimum application of energy by the winding of the cable 9 upon that portion of the cone 8 of lesser radius, and, furthermore, that these results are produced without varying the speed of rotation of the brake-handle 12ª. By referring to Fig. 2 it will be seen that since the spindle 14 at the commencement of the braking operation begins to rotate at a greater speed than the spindle 3 the slack in the chain 21 will be taken up sooner than the slack in the chain 19. This will throw the strain on the chain 21, which has therefore been termed the "main" brake chain or cable. I have termed the chain 19 an "auxiliary" chain for the reason that should the main chain 21, which is the first brake chain or cable to operate, part or become disabled then the chain 19 would immediately come into service and my braking mechanism would then operate in the customary manner.

If the mechanism is constructed as shown in Fig. 5, wherein the chain 21 is wound upon the cone 24, it will be seen that because of chain 21 winding on cone 24, which is of greater diameter than spindle 3, said chain will be taken up more rapidly than chain 19, and as chain 19 continues to wind on a spindle of uniform diameter its speed of winding is therefore uniform, and chain 21 will therefore always be on greater tension than chain 19, which in this structure also is purely an auxiliary or safety brake-chain and adapted to come into use should the main brake-chain 19 become disabled.

Cone 16 operates in opposition to spring 18, which causes a return movement of said cone after each braking operation, rewinding cable 9 thereon, and since cable 9 is rewound after each operation of the mechanism on cone 16 cone 8 is reversed. Cones or spindles 3 and 14 may be made capable of longitudinal movement to compensate for a greater or less speed of operation of the braking mechanism in order that the brake chains or cables or the cable 9 will not wind upon themselves.

The term "cable" is herein used in its broadest sense, in that it is intended to cover a chain, a rope, a wire, a band, or any other winding means of connection or power transmission between the two cones.

My improved mechanism is applicable to any brake mechanism, whether operated by hand, electrically, by steam, or otherwise; but I have shown the same operated by an ordinary brake-handle for purposes of illustration.

I am aware that it is not broadly new to employ a speed-increasing mechanism between the brake-handle and the brake-winding spindle of a brake mechanism, and I therefore do not claim this as broadly novel, but only in combination with the other features of my invention.

As shown in Fig. 3, the cable 9 may be adjustably secured to the cone 8. The same may be also adjustably secured to cone 16, although I have not shown such an arrangement. The advantage of this is that as the brake-shoe wears away the operative length of the brake-chain may be decreased through decreasing the operative length of the cable 9, so that the brake-shoe in its released position is brought nearer the car-wheel. A further advantage of this arrangement, as hereinbefore mentioned, is that this permits the easy adjustment of the released position of the brake-shoe upon transfer of a car from a road of one character to a road of another character. With the means for adjusting the operative length of the cable 9 described it is unnecessary to insert a new length of cable 9 upon the adjustment of the released position of the brake-shoe; but it is merely necessary to fasten or unfasten the cable 9, such as the case may be, at one or more of the points 9ª, so that a greater or less operative length of the cable 9, such as desired, may be brought into play.

Having thus described my invention, the following is what I claim as new therein and desire to secure by Letters Patent:

1. In a brake mechanism, the combination of an operating device and winding-spindle, of inverted cones mounted on said spindle and operating device, and a cable connecting the opposite ends of said cones.

2. In a brake mechanism, the combination with an operating device and a winding-spindle, of reversed cones mounted on said spindle and operating device, and a cable connected to the opposite ends of said cones to operate said spindle.

3. In a brake mechanism, the combination with a main winding-spindle, of an operating-shaft forming an auxiliary spindle, brake-chains connected to said spindles and suitable mechanism for transmitting motion from said operating-shaft to said main spindle.

4. In a brake mechanism, the combination with a winding-spindle and an operating-shaft forming an auxiliary spindle, of brake-chains connected to said spindles and suitable gearing between said shaft and main winding-spindle to rotate the main winding-spindle upon operation of said shaft.

5. In a brake mechanism, the combination with a main winding-spindle and an operating-shaft forming an auxiliary spindle, of brake-chains connected to said spindles, and suitable gearing between the said shaft and main winding-spindle to effect the rotation of the main spindle first faster and then slower than the rotation of the operating-shaft.

6. In a brake mechanism, the combination with the main winding-spindle and an operating-shaft, of an adjustable power connection between said shaft and spindle to transmit motion from one to the other.

7. In a brake mechanism, the combination with the main winding-spindle and an operating-shaft, of an adjustable cable connected to said spindle and shaft to transmit motion from one to the other.

8. In a brake mechanism, the combination with the spindle and an operating-shaft of cones mounted on said spindle and shaft and an adjustable cable connected to the opposite ends of said cones.

9. In a brake mechanism, the combination with the main winding-spindle and an operating-shaft, of inverted cones mounted on said spindle and shaft an operating-cable for connecting said cones and means for securing said operating-cable at different circumferential points on said cones.

10. In a brake mechanism the combination with a main winding-spindle and an operating-shaft, of inverted cones mounted on said spindle and shaft, an operating-cable for connecting said cones and means for securing different lengths of said cable on said cones to adjust the operative length of said cable.

11. In a brake mechanism the combination with a main winding-spindle and an operating-shaft, of inverted cones mounted on said spindle and shaft, an operating-cable connected to opposite ends of said cones and means for securing said cable to said cones at a point intermediate the ends of said cable.

12. In a brake mechanism the combination with a spring-controlled winding-spindle and an operating-shaft, of inverted cones mounted on said spindle and shaft and an operating-cable connected to opposite ends of said cones.

13. In a brake mechanism the combination with a main winding-spindle and an operating-shaft geared thereto and having a squared upper portion of a collar fitting snugly upon said squared upper portion and riveted thereto, and a crank-handle seated snugly in said collar and riveted thereto.

PETER M. KLING.

Witnesses:
S. J. HOEXTER,
HARRY A. KNIGHT.